(12) United States Patent
Do

(10) Patent No.: US 9,658,421 B2
(45) Date of Patent: May 23, 2017

(54) ARMOR ELEMENT FOR A FLEXIBLE LINE INTENDED TO BE PLACED IN AN EXPANSE OF WATER, AND ASSOCIATED FLEXIBLE LINE, METHOD AND PROCESS

(71) Applicant: TECHNIP FRANCE, Courbevoie (FR)

(72) Inventor: Anh Tuan Do, Cormeilles en Parisis (FR)

(73) Assignee: TECHNIP FRANCE (FR)

( * ) Notice: Subject to any disclaimer, the term of this patent is extended or adjusted under 35 U.S.C. 154(b) by 97 days.

(21) Appl. No.: 14/383,400

(22) PCT Filed: Mar. 6, 2013

(86) PCT No.: PCT/EP2013/054530
§ 371 (c)(1),
(2) Date: Sep. 5, 2014

(87) PCT Pub. No.: WO2013/131972
PCT Pub. Date: Sep. 12, 2013

(65) Prior Publication Data
US 2015/0030295 A1    Jan. 29, 2015

(30) Foreign Application Priority Data

Mar. 6, 2012   (FR) ...................................... 12 52036

(51) Int. Cl.
*G02B 6/44*        (2006.01)
*B32B 1/08*        (2006.01)
(Continued)

(52) U.S. Cl.
CPC .............. *G02B 6/4494* (2013.01); *B32B 1/08* (2013.01); *E21B 17/015* (2013.01);
(Continued)

(58) Field of Classification Search
None
See application file for complete search history.

(56) References Cited

U.S. PATENT DOCUMENTS

| 4,097,119 A | 6/1978 | Kumamaru et al. | |
|---|---|---|---|
| 4,812,014 A * | 3/1989 | Sawano | G01M 3/165 250/227.14 |

(Continued)

FOREIGN PATENT DOCUMENTS

| FR | 2 274 052 | 1/1976 |
|---|---|---|
| FR | 2 926 347 | 7/2009 |

(Continued)

OTHER PUBLICATIONS

International Search Report dated Apr. 24, 2013 issued in corresponding International patent application No. PCT/EP2013/054530.

(Continued)

*Primary Examiner* — Michelle R Connelly
(74) *Attorney, Agent, or Firm* — Ostrolenk Faber LLP

(57) ABSTRACT

This element includes a plurality of longitudinal carbon fiber filaments (52) and a polymeric matrix (50) receiving the filaments (52) for binding them together, the matrix (50) forming a ribbon intended to be wound around a longitudinal body of the flexible line. The armor element (42) includes at least one optical fiber (54) received in the matrix (50), the optical fiber (54) having an elongation at break of more than 2%, as measured with the ASTM-D 885-03 standard.

15 Claims, 2 Drawing Sheets

(51) Int. Cl.
*G01M 11/08* (2006.01)
*F16L 11/08* (2006.01)
*G01M 5/00* (2006.01)
*E21B 17/01* (2006.01)
*E21B 17/20* (2006.01)

(52) U.S. Cl.
CPC .......... *E21B 17/206* (2013.01); *F16L 11/083* (2013.01); *G01M 5/0025* (2013.01); *G01M 11/086* (2013.01); *G01M 11/088* (2013.01); *G02B 6/4415* (2013.01); *G02B 6/4416* (2013.01); *G02B 6/4427* (2013.01); *G02B 6/4432* (2013.01); *G02B 6/4486* (2013.01); *B32B 2262/106* (2013.01)

(56) References Cited

U.S. PATENT DOCUMENTS

| | | | | |
|---|---|---|---|---|
| 5,399,854 | A | * | 3/1995 | Dunphy .............. G01K 5/72 250/227.14 |
| 5,551,484 | A | * | 9/1996 | Charboneau ........ F16L 55/1656 138/104 |
| 6,047,094 | A | * | 4/2000 | Kalamkarov ........ G02B 6/3624 385/12 |
| 8,789,562 | B2 | * | 7/2014 | Kagoura .............. F16L 11/081 138/104 |
| 9,097,562 | B2 | * | 8/2015 | Freitag ................ G01D 5/353 |
| 2003/0075361 | A1 | * | 4/2003 | Terry .................. G01V 3/30 175/61 |
| 2005/0180677 | A1 | * | 8/2005 | Andrews ............. G01M 11/085 385/13 |
| 2010/0329629 | A1 | * | 12/2010 | Reichinger .......... B29C 35/065 385/147 |
| 2012/0210793 | A1 | * | 8/2012 | Daton-Lovett ..... E21B 47/0001 73/570 |

FOREIGN PATENT DOCUMENTS

| | | | |
|---|---|---|---|
| FR | WO 2011083286 A2 | * 7/2011 | ............ G01D 5/353 |
| JP | 11344390 A | * 12/1999 | |
| WO | WO 99/49259 A1 | 9/1999 | |
| WO | WO 02/088659 A2 | 11/2002 | |
| WO | WO 2006/102259 A2 | 9/2006 | |

OTHER PUBLICATIONS

Andersen M. Et al.: "Development of an Optical Monitoring System for Flexible Risers", Annual Offshore Technology Conference, XX, XX, May 1, 2001, pp. 249-255, XP008015969.

Kuang K S C et al.: "An evaluation of a novel plastic optical fibre sensor for axial strain and bend measurements. An evaluation of a novel plastic optical fibre sensor for axial strain and bend measurements", Measurement Science and Technology, IOP, Bristol, GB, vol. 13, No. 10, Oct. 1, 2002, pp. 1523-1534, XP20063616.

Jeroen Remery et al.: "The Free Standing Flexible Riser: A Novel Riser System for an Optimised Installation Process", Offshore Technology Conference, May 5, 2008, pp. 1-11, XP007918877.

* cited by examiner

ARMOR ELEMENT FOR A FLEXIBLE LINE INTENDED TO BE PLACED IN AN EXPANSE OF WATER, AND ASSOCIATED FLEXIBLE LINE, METHOD AND PROCESS

CROSS REFERENCE TO RELATED APPLICATIONS

The present application is a 35 U.S.C. §371 National Phase conversion of PCT/EP2013/054530, filed Mar. 6, 2013, which claims benefit of French Application No. 12 52036, filed Mar. 6, 2012, the disclosure of which is incorporated herein by reference. The PCT International Application was published in the French language.

TECHNICAL FIELD OF THE INVENTION

The present invention relates to a armor element for a flexible line intended to be placed in an expanse of water, comprising:
- a plurality of longitudinal carbon fiber filaments;
- a polymeric matrix receiving the filaments for binding them together, the matrix forming a ribbon intended to be wound around a longitudinal body of the flexible line.

BACKGROUND OF THE INVENTION

The flexible line is advantageously a flexible pipe as described in the normative documents published by the American Petroleum Institute (API), API 17J and API RP 17B, all well known to one skilled in the art.

This definition equally encompasses the flexible pipes of the unbonded type or of the bonded type.

More generally, the flexible pipe may be a composite collection of the <<bundle>> type comprising at least one fluid transport tube and a set of electric, hydraulic or optical links able to convey electric or hydraulic power or a piece of information, between the bottom and the surface of the expanse of water.

In still another alternative, the flexible line, an umbilical comprising a set of electric and/or optical and/or hydraulic lines able to convey a piece of information, electric power or hydraulic power.

Such flexible lines in the petroleum industry are notably used in deep seas, and frequently extend through an expanse of water between a surface facility and a bottom assembly. These flexible lines may also extend at the bottom of the expanse of water between bottom facilities.

In order to use the flexible lines in these types of applications, it is necessary to reinforce them considering the forces and pressures applied on the line. For this purpose, the flexible pipes generally include, from the inside to the outside, a metal carcass in order to spread out the crushing radial forces, an internal sealing sheath in polymer, for containing the transported fluid, a pressure vault in order to resist the internal pressure of the transported fluid in the internal sheath, and balanced armor plies for spreading the axial tensile loads.

The pipe generally comprises an external sheath in polymer for protecting the whole of the pipe and notably for preventing water from penetrating into its thickness.

The internal carcass and the pressure vault generally consist of wound longitudinal elements, following a short pitch. They impart to the pipe its resistance to radial stresses.

The armor plies often consist of metal profiles wound according to long pitches, in order to spread the axial loads.

The metal armor plies have the disadvantage of being sensitive to corrosion, and to have a large weight.

To overcome this problem, patent application WO 99/49259 of the applicant describes composite armors, made on the basis of carbon fibers.

The armors are formed on the basis of armor elements of the aforementioned type, comprising a plastic matrix in ribbon form and longitudinal carbon fiber filaments, preferably organized as rovings which are embedded in the matrix.

Such a ribbon has highly satisfactory mechanical characteristics, taking into account the high strength and the large chemical inertia of carbon fibers. Further, the cost of carbon fibers is relatively low as compared with that of other fibers.

Such armors are generally very robust and allow the flexible line to be positioned in the expanse of water for very long time periods.

However, in certain cases, it may be desirable to check that the flexible line keeps its integrity, notably just after its facility, and during its use.

SUMMARY OF THE INVENTION

An object of the invention is therefore to have available a armor element which has a light weight and extremely robust structure, and which may be placed in a flexible line, the integrity of which may be measured over time.

For this purpose, the subject-matter of the invention is a armor element of the aforementioned type, characterized in that the armor element includes at least one optical fiber received in the matrix, the optical fiber having an elongation at break of more than 2%, as measured with the ASTM-D 885-03 standard.

The armor element according to the invention may comprise one or several of the following features, taken individually or according to any technically possible combinations:
- the elongation at break of the optical fiber, measured with the ASTM-D 885-03 standard, is greater than 5%, advantageously greater than 8%;
- the optical fiber is a polymeric optical fiber;
- the optical fiber is made from a methacrylate polymer, such as polymethylmethacrylate (PMMA), based on a styrene polymer such as polystyrene, based on a polycarbonate polymer, based on a polyolefin polymer, such as methylpentene, based on a polyacrylonitrile polymer, based on a polymer which may be obtained by oxidation of an acrylonitrile polymer or based on a mixture thereof;
- the optical fiber is made from a polymethylmethacrylate polymer, from a polyacrylonitrile polymer and/or from a polymer which may be obtained by oxidation of an acrylonitrile polymer;
- the optical fiber is based on a polyacrylonitrile polymer or on a polymer which may be obtained by oxidation of an acrylonitrile polymer;
- the optical fiber is totally embedded in the matrix;
- the matrix is made on the basis of a thermoplastic resin notably selected from polymethylmethacrylate (PMMA), polyacrylate, polyacrylonitrile (PAN), polyamide (PA or nylon), polyamide-imide (PAI), polyaryletherketone (PAEK), polyolefin, polycarbonate (PC), polyketone (PK), polyester, polyetheretherketone (PEEK), polyetherketoneketone (PEKK), polyetherimide (PEI), polyimide (PI), polystyrene (PS), polyethersulfone (PES), polyphenylene sulphide (PPS), polysulfone (PSU) resins, a thermoplastic fluorinated polymer such as polyvinylidene fluoride (PVDF), polytetrafluoroethylene (PTFE), polychlorotrifluoroethylene (PCTFE), polyethylene chlorotrifluoroethylene (PECTFE) or polyethylene tetrafluoroethylene (PETFE) resins, or a mixture thereof;

the diameter of the optical fiber is less than 50 micrometers.

The subject-matter of the invention is also a flexible line intended to be placed in an expanse of water, characterized in that it includes:

a longitudinal body;

at least one armor element as described above, wound in the body or wound around the body.

The line according to the invention may comprise one or several of the following features, taken individually or according to any technically possible combinations:

the longitudinal body is an internal sheath delimiting a passage for circulation of a fluid, the armor element being wound around the internal sheath outside the internal sheath;

the longitudinal body is a retention cover containing at least one fluid transport tube, and/or at least one functional link intended to convey a piece of information, an electric and/or optical signal, and/or an electric power, the armor element being wound around the body.

The subject-matter of the invention is also a method for monitoring the properties of a flexible line as defined above, characterized in that it includes the following steps:

connecting the optical fiber present in the armor element to an apparatus for emitting an optical signal intended to be injected into the optical fiber, and to an apparatus for measuring an optical signal having passed in transit through the fiber;

injecting an optical signal by means of the apparatus for emitting the optical signal;

circulating the optical signal through the optical fiber present in the armor element;

measuring an optical signal having passed in transit into the optical fiber by means of the measuring apparatus.

The subject-matter of the invention is also a method for manufacturing a armor element as defined above, characterized in that it includes the following steps:

providing a plurality of longitudinal carbon fiber filaments;

forming a polymeric matrix receiving the filaments, for binding the filaments together, the matrix forming a ribbon intended to be wound around a longitudinal body of the flexible line;

characterized in that the method includes a step for positioning at least one optical fiber in the matrix, the optical fiber having an elongation at break of more than 2%, as measured with the ASTM-D 885-03 standard.

The method according to the invention may comprise the following feature:

the matrix is formed by pultrusion or extrusion of a polymer.

BRIEF DESCRIPTION OF THE DRAWINGS

The invention will be better understood upon reading the description which follows, only given as an example, and made with reference to the appended drawings, wherein.

DESCRIPTION OF EMBODIMENTS

Figure 1:
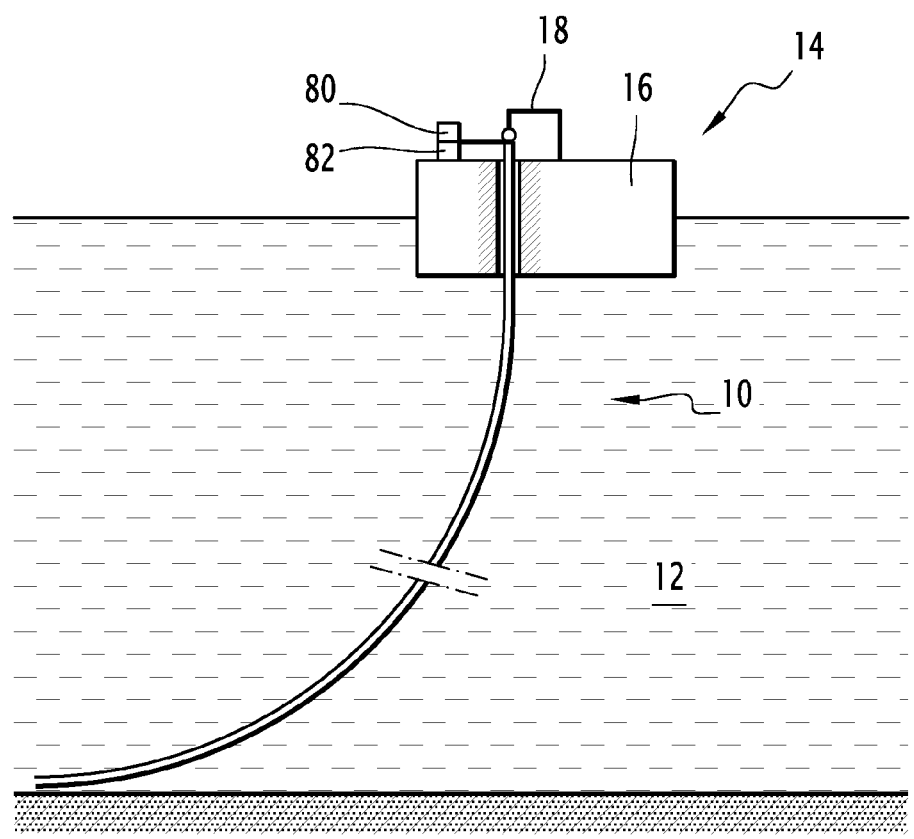
FIG. 1 is a schematic partial sectional view of a first facility for producing fluid through an expanse of water, applying a flexible line provided with a first armor element according to the invention.
Figure 2:
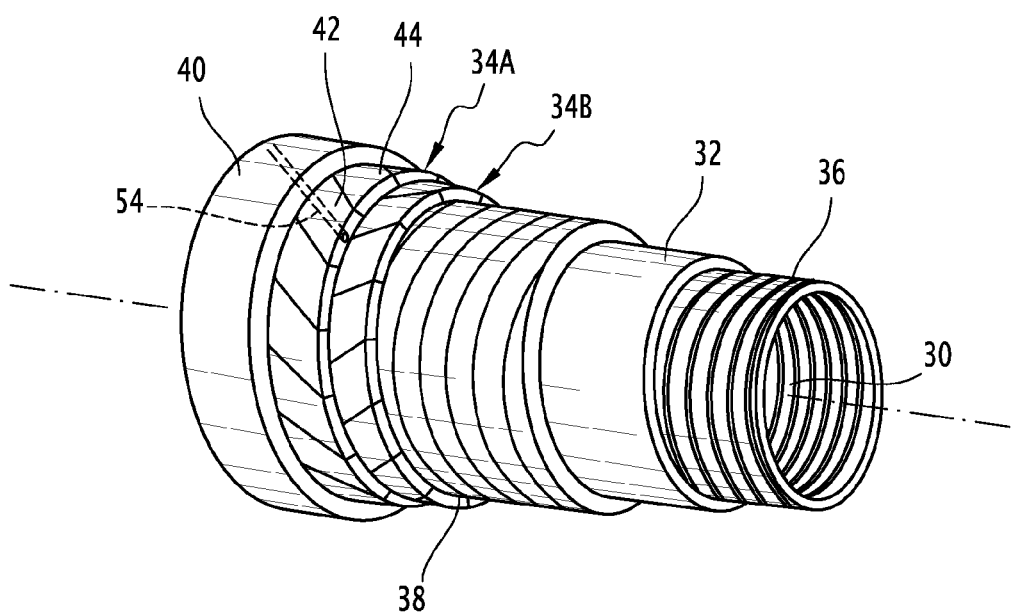
FIG. 2 is a partly exploded perspective view of a first exemplary flexible line according to the invention.
Figure 3:
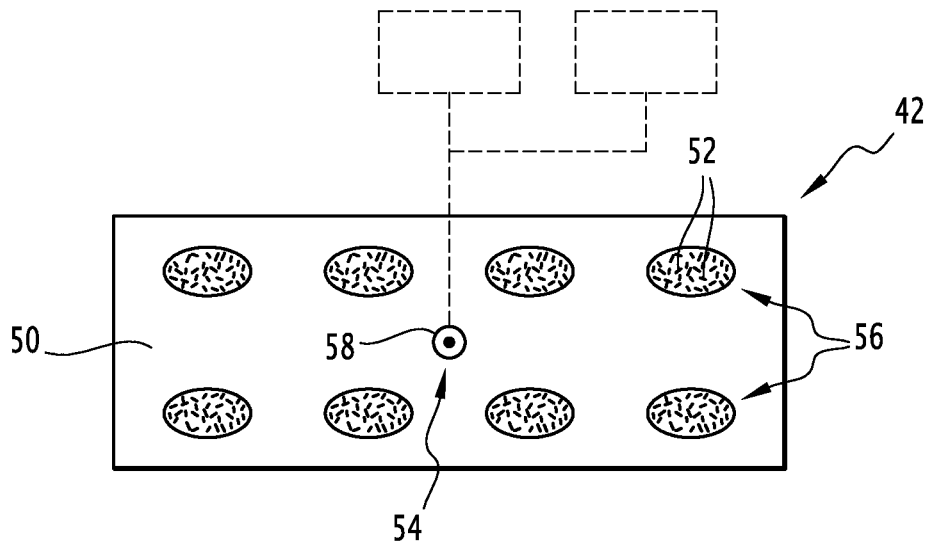
FIG. 3 is a view of a cross-section of a first exemplary armor element according to the invention.

A first flexible line 10 according to the invention is illustrated by FIGS. 1 to 3.

The flexible line 10 is positioned through an expanse of water 12 in a facility 14 for producing fluid, notably hydrocarbons.

The expanse of water 12 is for example a lake, a sea or an ocean. The depth of the expanse of water 12 at right angles to the facility 14 is for example comprised between 500 m and 3,000 m.

The facility 14 includes a surface assembly 16 and a bottom assembly (not shown) which are advantageously connected together through the flexible line 10.

The surface assembly 16 is for example a floating assembly. It is advantageously formed by a surface naval support, a semi-submersible platform, a floating vertical column or a ship. Alternatively, the surface assembly 16 is a fixed rigid structure of the "jacket" type or an oscillating structure secured to the bottom of the sea.

The surface assembly 16 includes at least one connector 18 intended to be connected to a downstream end of the flexible line 10.

In this example, the flexible line 10 connects the bottom assembly (not shown) to the surface assembly 16. The line 10 is therefore partly immersed in the expanse of water 12 and has an upper end positioned in a volume of air.

Alternatively, the flexible line 10 is totally immersed in the expanse of water 12 and for example connects two bottom assemblies (not shown) together.

The flexible line 10 includes at least one elongated body and at least one armor element according to the invention, wound around the elongated body.

In the example illustrated in FIG. 2, the first flexible line 10 is a flexible pipe intended for transporting a fluid, notably a hydrocarbon. It thus delimits a central passage 30 for circulation of fluid. Such a pipe is for example described in the normative documents published by the American Petroleum Institute, (API), API 17J and API RP17B.

The elongated body of the flexible line is formed by an internal sheath 32. The flexible line comprises at least one external armor layer 34A, 34B positioned around the internal sheath 32.

Advantageously and depending on the desired use, the line 10 further includes an internal carcass 36 positioned inside the internal sheath 32, a pressure vault 38 inserted between the internal sheath 32 and said or each armor layer 34A, 34B, and an external sheath 40, intended for protecting the pipe.

The internal sheath 32 is intended to sealably confine the transported fluid in the passage 30. It is formed in plastic material, for example based on a polyolefin, such as polyethylene, based on a polyamide such as PA11 or PA12, or based on a fluorinated polymer such as polyvinylidene fluoride (PVDF).

The thickness of the internal sheath 32 is for example comprised between 5 mm and 20 mm.

The carcass 36, when it is present, is formed as a spirally wound profiled metal sheet. The turns of the sheet are stapled to each other, which gives the possibility of spreading out the radial crushing loads.

In this example, the carcass 36 is positioned inside the internal sheath 32. The pipe is of the <<rough bore>> type.

Alternatively, (not shown) the flexible pipe is without any internal carcass 36. It is then designated by the term of <<smooth bore>>.

The helical winding of the profiled metal sheet forming the carcass 36 is with a <<short pitch>>, i.e. it has a helix angle with an absolute value close to 90°, typically comprised between 75° and 90°.

In this example, the pressure vault 38 is intended to spread the loads related to the pressure prevailing inside the internal sheath 32. For example it is formed with a metal profiled wire helically wound around the sheath. The profiled wire generally has a complex geometry, notably with the shape of a Z, T, U, K, X or I.

The pressure vault 38 is generally helically wound with a short pitch around the internal sheath 32.

The flexible line 10 according to the invention comprises at least one armor layer 34A, 34B, formed with a helical winding of elongated armor elements 42, 44.

In the example illustrated in FIG. 2, the flexible line 10 includes a plurality of armor layers 34A, 34B.

Each armor layer 34A, 34B includes longitudinal armor elements 42, 44 wound with a long pitch around the axis A-A' of the pipe. By <<wound with a long pitch>>, is meant that the absolute value of the helix angle is less than 60°, and is typically comprised between 25° and 55°.

The armor elements 42, 44 of a first armor layer 34A are generally wound according to an opposite angle relatively to the armor elements 42, 44 of a second armor layer 34B. Thus, if the winding angle of the elements 42, 44 of the layer 34A is equal to +α, α being comprised between 25° and 55°, the winding angle of the armor elements 42, 44 of the second armor layer 34B positioned in contact with the first armor layer 34A, is for example −α, with α comprised between 25° and 55°.

At least one of the armor layers 34A, 34B comprises an instrumented armor element 42 according to the invention and advantageously, at least one non-instrumented armor element 44.

A first instrumented armor element 42 is illustrated by FIG. 3. This armor element 42 includes a polymeric matrix 50, a plurality of filaments 52 based on carbon fibers and, according to the invention, at least one optical fiber 54 embedded in the matrix.

The armor element 42 is elongated. It has a length greater than its other dimensions, notably than its width and its thickness.

The length of the armor element 42 is for example greater than 100 meters and is notably comprised between 500 meters and 5,000 meters. The maximum width of the armor element 42, taken perpendicularly to its axis is less than 100 mm, and is notably comprised between 10 mm and 30 mm.

The maximum thickness of the armor element 42 is less than its width, and is notably less than 10 mm. This thickness is for example comprised between 0.8 mm and 3 mm.

As illustrated by FIG. 3, the armor element 42 has a polygonal, advantageously rectangular outer contour cross-section. Alternatively, the outer contour of the cross-section is oval or circular.

The matrix 50 is formed on the basis of a thermosetting resin, or a thermoplastic resin.

The thermosetting resin is for example an epoxy resin, a resin of the polyimide type, such as a bismaleimide resin, a polyurethane or polyisocyanurate resin, an aminoplast resin, such as a urea-formaldehyde resin (UF), a melamine formaldehyde resin (MF) or a phenol-formaldehyde resin (PF), an unsaturated polyester resin (UP), a vinylester resin (VE) or a mixture thereof.

In this case, the curing of the resin is advantageously carried out by pultrusion, at a temperature below 280° C., notably below 260° C., advantageously comprised between 200° C. and 220° C.

The resin forming the matrix is cross-linked, notably by maintaining it at a positive temperature for a duration of more than 24 hours, notably of the order of 48 hours. The temperature of this heat treatment is greater than 200° C., and notably comprised between 220° C. and 250° C.

Alternatively, the resin is a thermoplastic resin, notably selected from polymethylmethacrylate (PMMA), polyacrylate, polyacrylonitrile (PAN), polyamide (PA or Nylon), polyamide-imide (PAI), polyaryletherketone (PAEK), polyolefin, polycarbonate (PC), polyketone (PK), polyester, polyetheretherketone (PEEK), polyetherketoneketone (PEKK), polyetherimide (PEI), polyimide (PI), polystyrene (PS), polyethersulfone (PES), polyphenylene sulfide (PPS), polysulfone (PSU) resins, a thermoplastic fluorinated polymer such as polyvinylidene fluoride (PVDF), polytetrafluoroethylene (PTFE), polychlorotrifluoroethylene (PCTFE), polyethylene chlorotrifluoroethylene (PECTFE) or polyethylene tetrafluoroethylene (PETFE) resins, or a mixture thereof.

The filaments 52 are generally laid out in the form of longitudinal rovings 56 including a plurality of filaments 52 mechanically bound to each other by twisting, by grouping in parallel or by spinning an assembly of either continuous or discontinuous fibers or filaments.

In the sense of the invention, more generally by <<roving>> is meant a set or group of twisted or non-twisted continuous yarns together, each yarn may be a monofilament or may be a set of either continuous or discontinuous fibers or filaments, notably assembled by twisting or spinning.

If necessary, a roving 56 may be obtained by assembling several elementary rovings, by twisting or simply by grouping several elementary rovings in parallel.

In the industry of carbon fibers, the term of <<roving>> is used for designating rovings consisting of elementary fibers. The number of elementary fibers which a roving includes, is generally a multiple of 6,000, the customary values being typically 6,000, 12,000, 18,000, 24,000, 30,000, 36,000, 42,000, 48,000, 56,000 and 60,000. The rovings including at least 48,000 fibers are designated by the term of <<heavy roving>>.

The roving 56 advantageously includes between 6,000 and 60,000 elementary carbon fibers.

The diameter of each carbon fiber is advantageously comprised between 6 micrometers and 12 micrometers, typically of the order of 8 micrometers. The maximum transverse dimension of the rovings 56 is typically comprised between 0.5 mm and 2 mm. The filaments 52, optionally in the form of rovings 56, are embedded in the matrix 50.

The ribbon formed by the matrix 50 containing the fibers 52 is for example of the ultra-dense type. This means that the level of fibers 52, taken by volume relatively to the total volume of the fibers 52 and of the matrix 50 in the armor element 42 is greater than 50%, advantageously greater than or equal to 60%, and preferably greater than or equal to 70%.

Thus, the armor element 52 is particularly robust. It has a longitudinal breakage strength of more than 2,000 MPa, and notably greater than 2,700 MPa, and an elongation at break of more than 1.5%, notably more than 1.6%, both of these characteristics being measured according to the ASTM D3039 standard.

As illustrated by FIG. 3, the armor element 42 according to the invention includes at least one optical fiber 54 received in the matrix 50, advantageously embedded in the matrix.

The optical fiber 54 extends longitudinally through the armor element 42.

In the example illustrated in FIG. 3, the armor element 42 includes an optical fiber 54 positioned in the vicinity of the longitudinal axis of the armor element 42.

Figure 5:
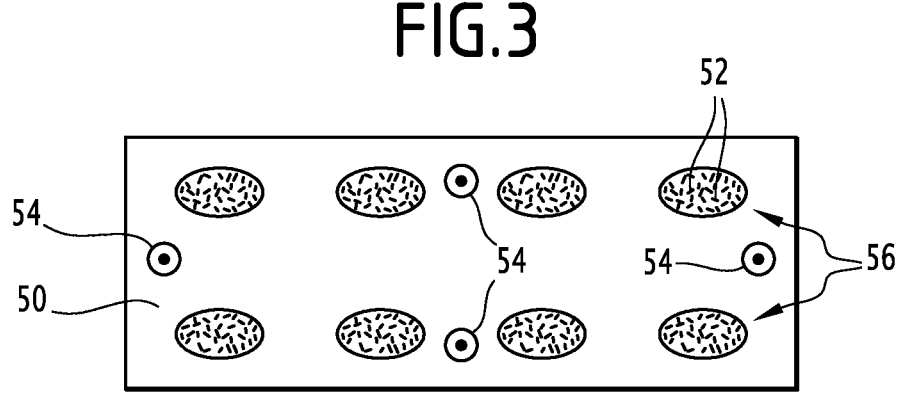
FIG. 5 is a view similar to FIG. 3 of an alternative armor element according to the invention.

In the alternative illustrated in FIG. 5, the armor element 42 includes at least two optical fibers 54 respectively positioned along the side edges of the element 42, and advantageously two optical fibers 54 positioned in the vicinity of an outer surface and of an inner surface of the armor element 42.

The optical fiber 54 advantageously consists exclusively of a core for 58 forming a light wave guide. The fiber 54 is thus without any outer sheath.

In the case when, on the one hand, the core of the optical fiber 54 has a substantially constant optical index in the whole of its section, and when, on the other hand, the optical fiber 54 is without any outer sheath, the matrix 50 in contact with the core of the optical fiber has an optical index below that of the core of the optical fiber. Guided propagation of light radiation may occur along such an optical fiber.

Alternatively, the optical fiber 54 includes a core 58 surrounded by a sheath with an optical index below that of the core, with an advantageously homothetic cross-section to that of the core 58.

The fiber 54 is totally embedded in the matrix 50. It is surrounded on the whole of its periphery by the polymer forming the matrix 50. According to the invention, it has an elongation at break of more than 2% as measured with the ASTM D885-03 standard.

Advantageously, the optical fiber 54 has an elongation at break of more than 5%, notably more than 8%, and advantageously comprised between 8% and 15%, measured with the aforementioned standard.

The core 58 of the optical fiber has a diameter of less than 60 microns, notably less than 50 microns, for example comprised between 5 and 20 microns, and more particularly comprised between 8 and 10 microns.

The optical fiber 54 is advantageously more transparent than the polymeric matrix 50, notably for light radiations in the range of visible light (wavelength in vacuum comprised between 400 nanometers to 800 nanometers) and/or in the range of the infrared (wavelength in vacuum comprised between 800 nanometers and 1,000,000 nanometers) and/or in the field of the near infrared (wavelength in vacuum comprised between 800 nanometers and 1,400 nanometers) and/or in the range of the ultraviolet (wavelength in vacuum comprised between 100 nanometers and 400 nanometers) and/or in the field of ultraviolet of the A type (wavelength in vacuum comprised between 315 nanometers and 400 nanometers).

The attenuation of the optical fiber 54 for radiation having a wavelength in vacuum equal to 1,000 nanometers (near infrared) is advantageously less than 10 decibels per meter (dB/m), more advantageously less than 2 dB/m, even more advantageously less than 0.2 dB/m, and preferentially less than 0.01 dB/m.

As a general rule, it is advantageous to select an optical fiber 54 having an attenuation as low as possible, insofar that the fiber moreover has sufficient mechanical characteristics.

In an embodiment, the optical fiber 54 is made on the basis of silica, notably glass. It then has an elongation at break comprised between 4% and 5%, as measured with the aforementioned standards.

In another embodiment, the optical fiber 54 is a polymeric optical fiber designated by the acronym <<POF>>.

In the case of an optical fiber 54 of this type, the elongation at break is greater than 5%, and is advantageously greater than 10%, measured with the aforementioned standard.

The fiber 54 is for example made on the basis of a methacrylate polymer, such as polymethylmethacrylate (PMMA), on the basis of a styrene polymer such as polystyrene, on the basis of a polycarbonate polymer, based on a polyolefin polymer, such as methylpentene, on the basis of a polyacrylonitrile polymer, on the basis of a polymer which may be obtained by oxidation of an acrylonitrile polymer or on the basis of a mixture of the latter.

Preferably, the fiber 54 is made on the basis of a polymethylmethacrylate polymer, of a polyacrylonitrile polymer and/or of a polymer which may be obtained by oxidation of an acrylonitrile polymer.

In the sense of the present application, by <<polyacrylonitrile polymer>> (PAN), is meant a polymer comprising at least 70%, preferably at least 85% of units derived from the acrylonitrile monomer (AN), the other units being for example derived from methyl acrylate (MA), meth(methylacrylate) (MMA) and/or vinyl acetate (VA) monomers. The polyacrylonitrile polymer may therefore be a homopolymer of polyacrylonitrile or a copolymer of polyacrylonitrile.

The polymer which may be obtained by oxidation of an acrylonitrile polymer is typically the polymer obtained by heating a polyacrylonitrile polymer to a temperature above 100° C. and notably comprised between 150° C. and 250° C., preferably for 2 hours to 48 hours. This heat treatment leads to oxidation of the acrylonitrile polymer in the presence of air or oxygen.

As explained hereafter, the method for preparing the armor element 42 comprising at least one optical fiber 54 may comprise a pultrusion step, and may comprise a heat treatment step 76 at these temperatures. Thus, exposing an optical fiber in acrylonitrile polymer to these temperatures typically leads to obtaining a polymeric optical fiber which may be obtained by oxidation of an acrylonitrile polymer.

As the polyacrylonitrile polymer and the polymer which may be obtained by oxidation of an acrylonitrile polymer have high resistance to temperature (typically, they resist to temperatures from 200° C. to 250° C.), good ageing and elongation properties, the fibers 54 based on these polymers are more preferred. Further, the optical fibers in polyacrylonitrile polymer or in a polymer which may be obtained by oxidation of an acrylonitrile polymer generally have a smaller diameter than those in polymethylmethacrylate. In particular, it is possible to prepare optical fibers based on a polyacrylonitrile polymer or on a polymer which may be obtained by oxidation of an acrylonitrile polymer having a diameter of less than 60 μm, which is generally difficult to obtain with optical fibers based on a polymethylmethacrylate polymer.

In this case, the optical fiber advantageously has an elongation at break as noted by the aforementioned standard, of more than 10%.

Further, the thereby obtained optical fiber 54 has significant robustness for its diameter. The range of diameters of the fiber 54 is substantially similar to the diameter of the filament 52 of carbon fibers used for reinforcing the armor element 42.

Further the chemical nature of the optical fiber 54, notably when it is based on PAN, results in good adherence and good cohesion with the matrix 50.

Advantageously, the optical fiber 54 extends over the whole length of the armor element 42 and more generally over a length greater than at least 10% of the length of the armor 42. At least one end region of the optical fiber juts out of the matrix 50 so as to allow its connection.

In this example, at least one armor element 44 is non-instrumented. The armor element 44 is for example formed with a matrix 50 identical with that of the armor element 42 and with filaments 52 identical with those of the armor element 42, these filaments 52 being embedded in the matrix 50.

Alternatively, the elongated element 42 is formed on the basis of a metal or composite wire.

The non-instrumented armor element 44 is without any optical fiber.

The elements 42, 44 are helically wound while being adjacent to each other for forming the armor layer 34A, 34B.

The outer sheath 40 is intended to prevent permeation of fluid from the outside of the flexible line 10 to the inside. It is made in polymer.

In the example illustrated in FIG. 2, the flexible pipe is advantageously mounted <<unbonded>>. Alternatively, the pipe is of the bonded type.

Figure 4:
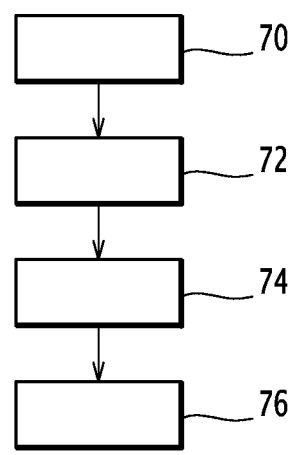
FIG. 4 is a functional block diagram illustrating different steps of a method for manufacturing a armor element according to the invention.

A method for manufacturing the armor element 42 will now be described, with reference to FIG. 4.

This method comprises a step 70 for providing carbon fiber filaments 52 and for providing at least one optical fiber 54, a step 72 for shaping the filaments 52 and the optical fiber 54, and then a step 74 for forming the matrix 50.

The method then includes an optional treatment step 76 for cross-linking the matrix 50.

In step 70, spools of carbon fiber filaments 52 are provided. At least one optical fiber spool 54 is also provided in parallel and is mounted on a spinning machine.

Next, the carbon fibers 52 and the optical fiber 54 are unwound through a die intended to receive the precursor material of the matrix 50.

When the matrix 50 is made by pultrusion from a thermosetting material, the precursor of the thermosetting material is led through the die in order to embed the carbon fiber filaments 52 and the optical fiber 54.

Next, the precursor material is heated to a temperature above 40° C. and notably comprised between 50° C. and 200° C. for achieving curing of the resin.

In step 76, the thereby obtained ribbon is heat-treated at a temperature above 150° C. for ensuring cross-linking of the polymeric matrix 50.

The thereby obtained armor element 42 may then be wound around the elongated body formed in this example by the internal sheath 32, with possible interposition of the pressure vault 38.

A method for monitoring the integrity of the flexible line 10 according to the invention will now be described.

Initially, the flexible line 10 is deployed through the expanse of water 12. Next, at least one optical fiber 54 received in a armor element 42 is optically connected to an apparatus 80 for emitting an optical signal in order to allow injection of an optical signal into the optical fiber 54 on the one hand, and to an apparatus 82 for receiving an optical signal having passed in transit through the fiber 54 on the other hand.

Advantageously, the emission apparatus 80 and the reception apparatus 82 are connected to the armor element 42 at one of its ends, notably on the whole of the surface 16.

An optical loop may be made in order to determine the signal transmitted through the loop and to compare it with the injected signal.

Alternatively, the optical fiber 54 comprises segments of the Bragg grating type. Partial reflections at different wavelengths may be measured on the fiber, which gives the possibility inter alia of carrying out a measurement of the temperature and/or of the elongation of the armor element 42 at right angles to each Bragg grating.

Alternatively, measurements are conducted by using a reflectometry technique in the time domain, designated by the term of <<Optical Time Domain Reflectometer>>. These reflectometer measurements may notably be made on back-scattered radiations of the Rayleigh, Raman and Brillouin type. Raman reflectometry allows a distributed measurement of the temperature along the optical fiber 54. Brillouin reflectometry allows a distributed measurement of the axial stress and of the temperature along the optical fiber 54.

Thus, it is possible to measure various properties relating to the flexible line 10, for example, mechanical measurements of stress and/or of deformation, temperature measurements, liquid leakage measurements, wear and tear measurements, mechanical deformation measurements, pressure measurements, measurements of chemical composition of the ambient medium, and/or pH measurements of the liquid in contact with the armor element 42. The measurements of chemical composition may notably be made by having the optical fiber 54 equipped with an external cladding which may capture and/or release certain chemical components through adsorption and desorption mechanisms, these phenomena further having an influence on certain optical properties of the fiber.

By means of the invention which has just been described, it is possible to have a armor element 42 with an extremely robust structure in order to reinforce a flexible line and which nevertheless gives the possibility of measuring, during the use of a flexible line, properties relating to this line.

The presence of an optical fiber 54 embedded within the armor element 42 guarantees that the measurement is representative of the physical phenomena present on the flexible line 10. The presence of an optical fiber 54 having an elongation at break of more than 2% gives the possibility of carrying out the suitable measurements by means of the optical fiber.

Further, in the case of optical fibers having a breakage strength of more than 5%, notably when the optical fibers are plastic optical fibers, the measurement may be conducted for much larger ranges of uses for the flexible line 10.

Further, accounting for chemicals of the plastic optical fiber 54 with the matrix 50, notably when it is made on the basis of polyacrylonitrile, its greater chemical strength, its robustness and the small diameter compatible with the use as an optical fiber, guarantee a simple elaboration of the armor element 42 and an adequate operation over a long time period.

What is claimed is:
1. A flexible line configured for placement in an expanse of water, including:
 a longitudinal body;
 at least one armor layer formed with a helical winding of at least one armor element, the armor element comprising:
 a plurality of longitudinal carbon fiber filaments;

a polymeric matrix receiving the filaments and binding the filaments together, the matrix forming a ribbon configured to be wound around a longitudinal body of the flexible line;
at least one optical fiber received in the matrix, the optical fiber having an elongation at break of more than 2%, as measured with the ASTM-D 885-03 standard.

2. The line according to claim 1, wherein the elongation at break of the optical fiber, as measured with the ASTM-D 885-03 standard, is greater than 5%.

3. The line according to claim 2, wherein said elongation at break is greater than 8%.

4. The line according to claim 1, wherein the optical fiber is a polymeric optical fiber.

5. The line according to claim 4, wherein the optical fiber is made based on a methacrylate polymer, such as polymethylmethacrylate (PMMA), based on a styrene polymer such as polystyrene, based on a polycarbonate polymer, based on a polyolefin polymer, such as methylpentene, based on a polyacrylonitrile polymer, based on a polymer which may be obtained by oxidation of an acrylonitrile polymer or based on a mixture thereof.

6. The line according to claim 5, wherein the optical fiber is made from a polymethylmethacrylate polymer, a polyacrylonitrile polymer and/or a polymer which may be obtained by oxidation of an acrylonitrile polymer.

7. The line according to claim 6, wherein the optical fiber is based on a polyacrylonitrile polymer or a polymer which may be obtained by oxidation of an acrylonitrile polymer.

8. The line according to claim 1, wherein the optical fiber is totally embedded in the matrix.

9. The line according to claim 1, wherein the matrix is made on the basis of a thermoplastic resin.

10. The line according to claim 9, wherein the matrix is selected from polymethylmethacrylate (PMMA), polyacrylate, polyacrylonitrile (PAN), polyamide (PA or Nylon), polyamide-imide (PAI), polyaryletherketone (PAEK), polyolefin, polycarbonate (PC), polyketone (PK), polyester, polyetheretherketone (PEEK), polyetherketoneketone (PEKK), polyetherimide (PEI), polyimide (PI), polystyrene (PS), polyethersulfone (PES), polyphenylene sulphide (PPS), polysulfone (PSU) resins, a thermoplastic fluorinated polymer, polyvinylidene fluoride (PVDF), polytetrafluoroethylene (PTFE), polychlorotrifluoroethylene (PCTFE), polyethylene chlorotrifluoroethylene (PECTFE) or polyethylene tetrafluoroethylene (PETFE) resins, or a mixture thereof.

11. The line according to claim 1, wherein the diameter of the optical fiber is less than 50 micrometers.

12. The line according to claim 1, wherein the longitudinal body is an internal sheath delimiting a passage for circulation of a fluid, the armor element being wound around the internal sheath on the outside of the internal sheath.

13. The line according to claim 12, wherein the longitudinal body is a retention cover containing at least one fluid transport tube, and/or at least one functional link configured to convey a piece of information, an electric and/or optical signal, and/or an electric power, the armor element being wound around the body.

14. A method for controlling properties of a flexible line according to claim 12, including the following steps:
connecting the optical fiber present in the armor element to an apparatus for emitting an optical signal intended to be injected into the optical fiber and to an apparatus for measuring an optical signal having passed in transit through the fiber;
injecting an optical signal with the apparatus for emitting the optical signal;
circulating the optical signal through the optical fiber present in the armor element;
measuring an optical signal having passed in transit through the optical fiber with the measurement apparatus.

15. The line according to claim 1, wherein the armor element has a longitudinal breakage strength of more than 2,000 Mpa.

* * * * *